4 Sheets—Sheet 2.
C. D. WRIGHTINGTON, dec'd.
C. W. CLIFFORD, Adm'r.
Machine for Manufacturing Needles.
No. 221,523. Patented Nov. 11, 1879.
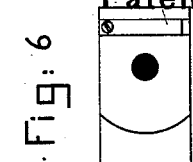
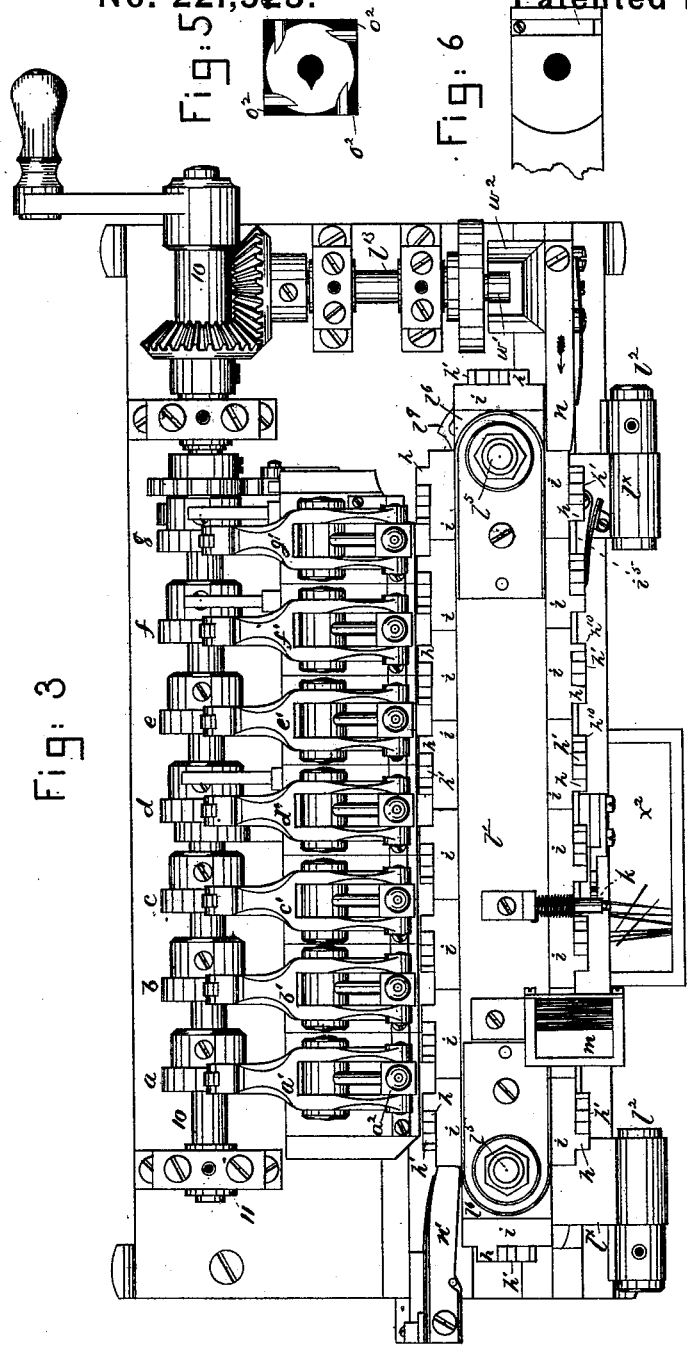
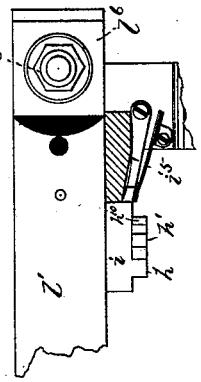
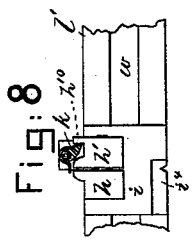
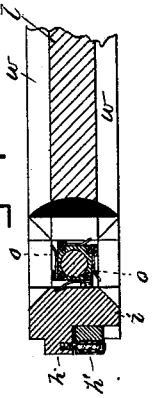
Witnesses.
Inventor.

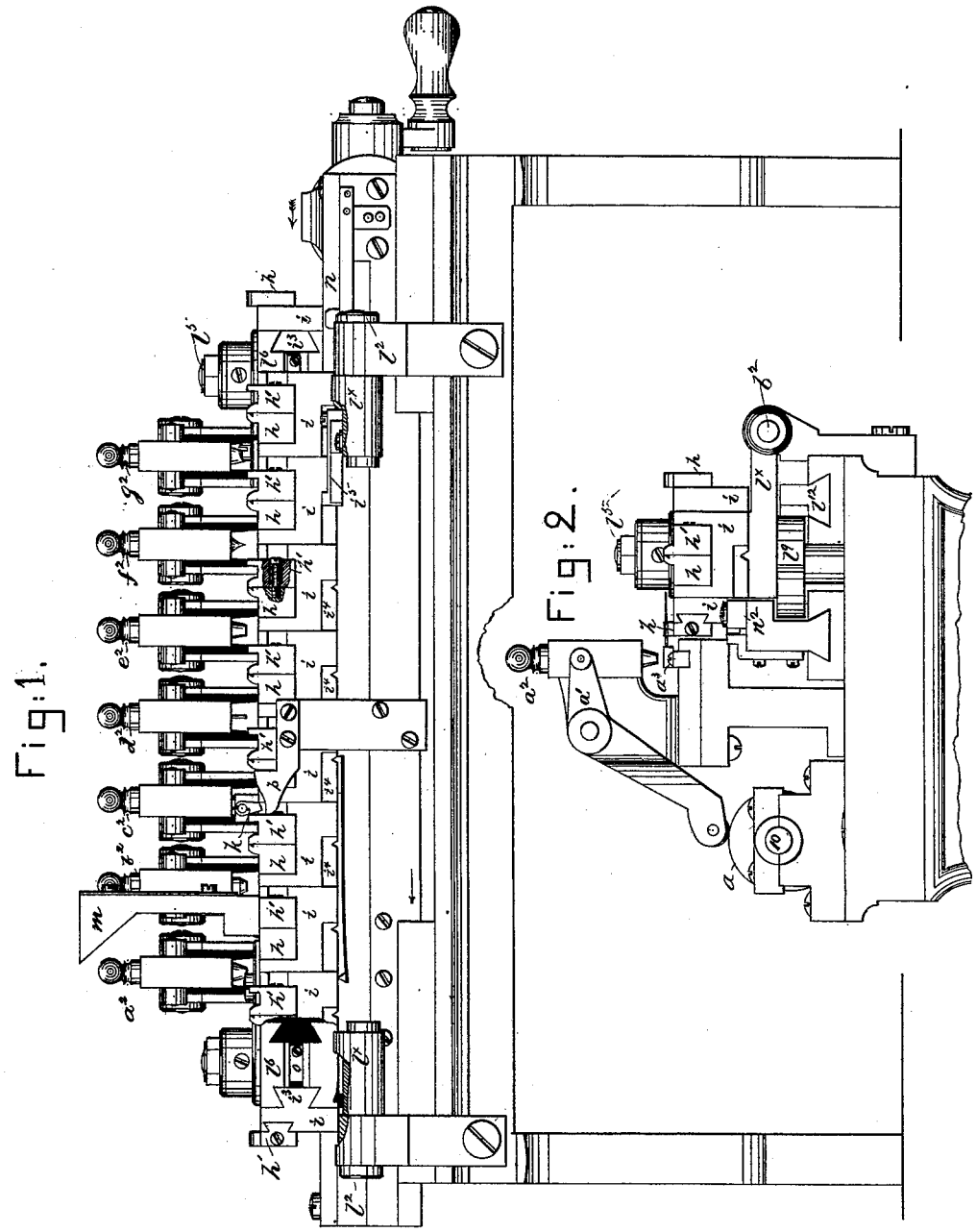

4 Sheets—Sheet 3.

C. D. WRIGHTINGTON, dec'd.
C. W. CLIFFORD, Adm'r.
Machine for Manufacturing Needles.

No. 221,523. Patented Nov. 11, 1879.

Witnesses.

Inventor.
Charles W. Clifford
Adm'r of Charles D. Wrightington

N. PETERS, PHOTO-LITHOGRAPHER, WASHINGTON, D C.

4 Sheets—Sheet 4.

C. D. WRIGHTINGTON, dec'd.
C. W. CLIFFORD, Adm'r.
Machine for Manufacturing Needles.

No. 221,523. Patented Nov. 11, 1879.

Witnesses. Inventor.

UNITED STATES PATENT OFFICE.

CHARLES W. CLIFFORD, OF NEW BEDFORD, MASSACHUSETTS, ADMINISTRATOR OF CHARLES D. WRIGHTINGTON, DECEASED.

IMPROVEMENT IN MACHINES FOR MANUFACTURING NEEDLES.

Specification forming part of Letters Patent No. 221,523, dated November 11, 1879; application filed September 17, 1879.

*To all whom it may concern:*

Be it known that CHARLES DELANO WRIGHTINGTON, formerly of New Bedford, in the county of Bristol and State of Massachusetts, but now deceased, invented certain novel and useful Improvements in Machines for the Manufacture of Needles, of which the following description, in connection with the accompanying drawings, is a full, clear, and exact specification.

This invention relates to mechanism for the automatic manufacture of hand-sewing needles; and the invention consists, chiefly, in the combination, with a rising and falling needle-bed, of a series of independent movable blocks connected therewith, and provided with nippers to hold the needle-blanks and move or carry them intermittingly forward, substantially as hereinafter described; also, in a bed and intermittingly-operated squares mounted at its ends, combined with a series of independent nipper-carrying blocks connected with the said bed and squares, to permit the blocks to be moved along the sides of the bed and squares, the squares transferring the blocks from one to the other side of the bed, substantially as hereinafter described; also, in a bed and intermittingly-operated squares at its ends, and independent nipper-carrying blocks fitted to the bed and squares, to be moved with relation to the bed and squares as hereinafter described, combined with pawls to act upon and move the blocks from the sides of the squares into position to be held and guided by the sides of the bed; also, in other features specifically pointed out at the end of the specification.

Figure 9:
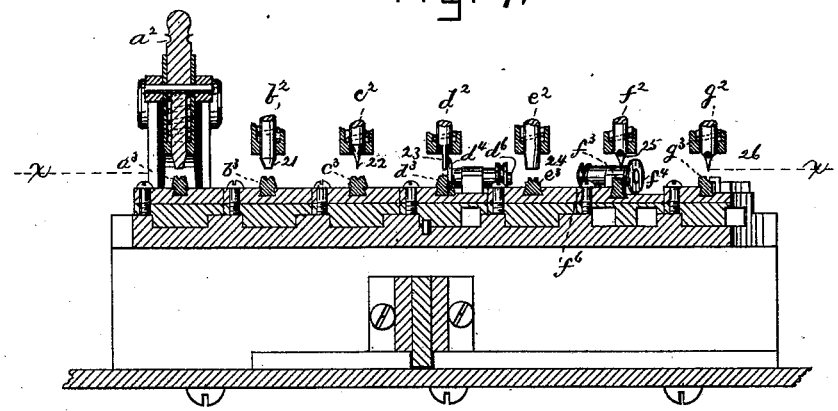
Figure 10:
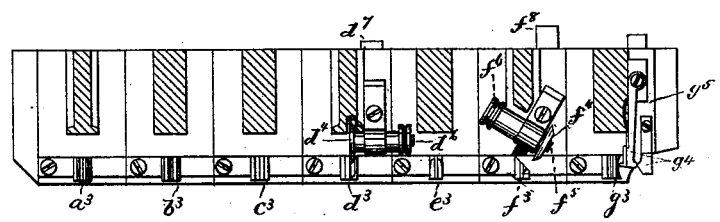
Figure 11:
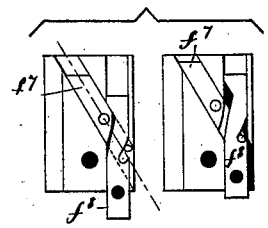
Figure 12:
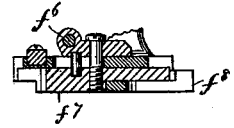
Figure 16:
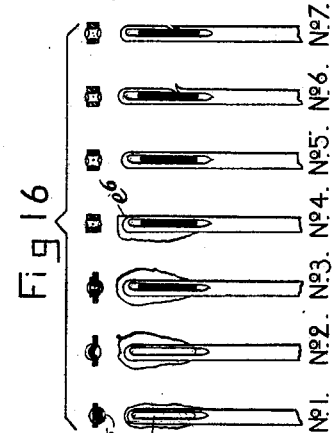
Figure 13:
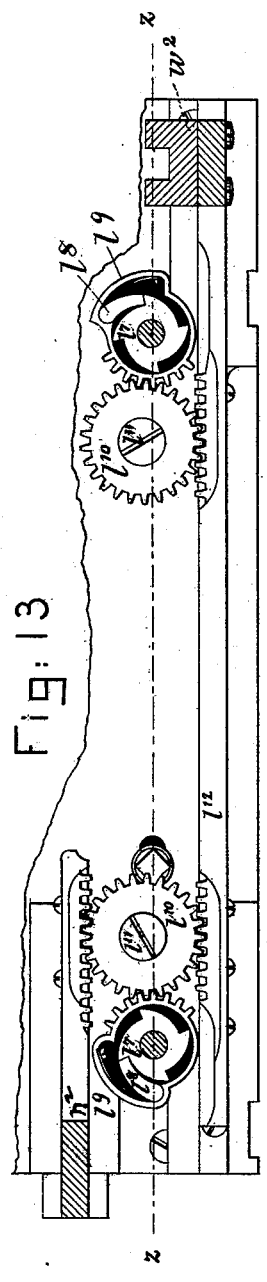
Figure 14:
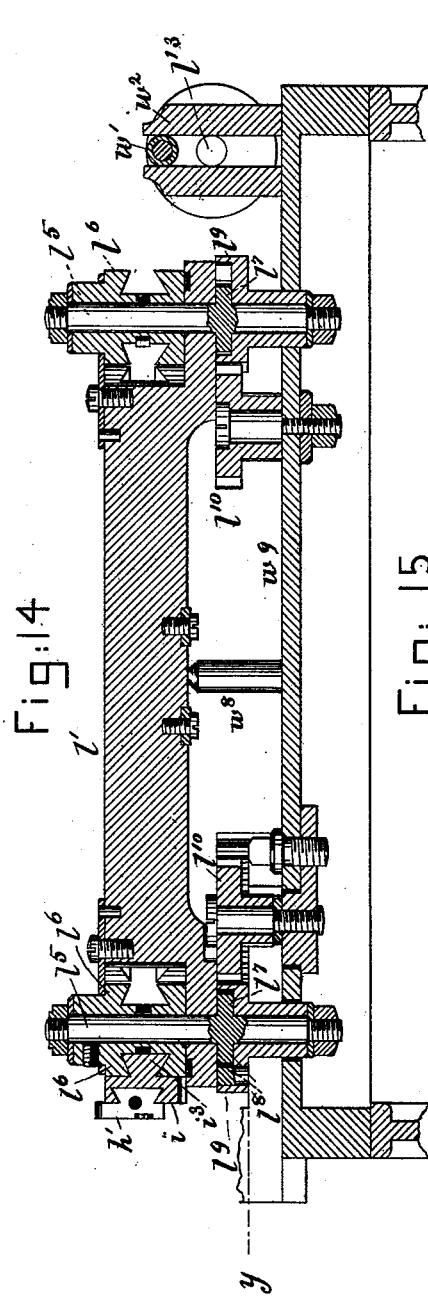
Figure 15:
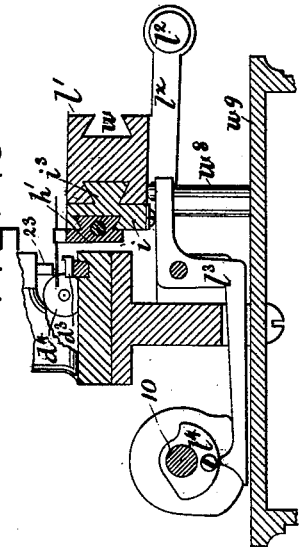

Figure 1 of the drawings represents in front elevation a needle-making machine embodying this invention; Fig. 2, an end view thereof; Fig. 3, a top view of Figs. 1; Figs. 4, 5, 6, and 7, details of portions of the rising and falling bed and its block-turning squares; Fig. 8, a detail of one of the nippers of the movable blocks; Fig. 9, a vertical section, showing the punches, eye-entering devices, and dies and cutters; Fig. 10, a section of Fig. 9 on line $x\ x$; Figs. 11 and 12, details of devices to slit the side of the eye. Fig. 13 is a section of the rising and falling bed on the line $y$, Fig. 14, looking upward. Fig. 14 is a section of Fig. 13 on line $z\ z$, Fig. 13. Fig. 15 is a cross-section, and Fig. 16 represents the successive stages or operations through which the needle-blank passes.

In this case all the devices have not been described, though they are shown to move all the parts; but for mechanism not so described reference may be had to an application of George Cooper, filed October 25, 1878; and it is well to state in this specification that the said application of the said Cooper is for improvements on this present machine invented by CHARLES DELANO WRIGHTINGTON, deceased.

In the embodiment of this invention represented in the drawings, the main shaft 10 of the machine, mounted in bearings 11, attached to the frame-work, which is of suitable shape to sustain the working parts, has a series of cams, $a\ b\ c\ d\ e\ f\ g$, each adapted to operate a suitable lever, $a'\ b'\ c'\ d'\ e'\ f'\ g'$, attached to the bars $a^2\ b^2\ c^2\ d^2\ e^2\ f^2\ g^2$, guided in suitable heads, and provided at their lower ends with stamps and punches, and with eye-entering devices for the eyes of the blanks, each one of the said parts carried by the bars co-operating with its own proper die, $a^3\ b^3\ c^3\ d^3\ e^3\ f^3\ g^3$.

The stamp on bar $a^2$ and die $a^3$ receive the end of the wire or blank to be made into a needle, and groove the blank at its under side, as at $a^5$, (see No. 1, Fig. 16,) to form or assist in forming the depression for the eye. From die $a^2$ the blank No. 1 is transferred, as will be hereinafter described, into position to be acted upon by the stamp 21 and die $b^3$, they shaping the blank, as in No. 2, Fig. 16, wherein it will be noticed that the head of the blank has two depressions formed in it, one at each side, the said depressions varying in depth from end to end, being deepest at or near the central portions of the length of the grooves, and depressing the metal most just where the punch 22 is to operate to form the opening for the eye.

The stamp 21, carried by bar $b^2$, and the die $b^3$, besides grooving the head of the blank, as just described, will also define the shape of the outer portion of the head of the needle about the eye and the thickness of the walls of the eye, as in the said Geo. Cooper application. Such a die will operate upon the blank, leaving more metal at one side of the eye (as shown in Fig. 16, the left-hand side of the said eye) than at the other side.

After the eye is operated upon by the stamp 21, the blank is removed and placed under the punch 22, carried by the bar $c^2$, the punch co-operating with a die, $c^3$, having a hole down through it, and punching from the blank a portion of the metal inside the grooves made by the stamp 21, leaving an open eye or passage, as denoted in heavy black lines. (See No. 3, Fig. 16.) This blank (shown at No. 3) is then placed under the eye-entering device 23, at the lower end of bar $d^2$, which, as it descends, enters the eye and serves to hold the blank in correct position on the die-bed $d^3$, while one rotating disk-cutter or saw, $d^4$, on a shaft, $d^6$, mounted in bearings suitably attached to a sliding carriage, $d^7$, (see Fig. 10,) is moved forward along the head end of the blank at one side of the eye by devices substantially as in an application filed by Geo. Cooper, as aforesaid, wherein two such cutters are shown.

In this present invention the one saw removes the "flash" or surplus metal from the eye-forming portion or wall of the needle at but one side. After trimming the side of the eye, as represented in No. 4, the blank will be moved under the cutter 24 at the lower end of the bar $e^2$, and laid upon or in the holding-die $e^3$, where the flash or surplus metal at the end of the blank and other side of the eye will be cut away.

This last operation completes the eye, and would be all that would be required for the eye of a common hand-needle. The blank No. 5 will next be presented to the action of the eye entering device 25 at the end of bar $f^2$, it co-operating with a proper support or die, $f^3$, to hold the blanks firmly in position. This die $f^3$ will be slotted at one side, (see Fig. 10,) and the eye-entering device 25 will be so shaped that the slitting-cutter $f^4$, mounted upon a rotating shaft, $f^5$, having a belt-pulley, $f^6$, operated upon by a band or belt in any suitable way, will operate to pass the edge of the cutter through the said slot and slit the eye open at its thinner or weaker side, as shown at No. 6, Fig. 16.

The shaft $f^5$ is supported upon a suitable carriage, $f^7$, adapted to move diagonally or in the path of the dotted line. (See Figs. 11, 12.) This carriage $f^7$ is actuated by a cam-slide, $f^8$. (See Fig. 11, which shows an under-side view of the carriage and the cam-slide, the left-hand diagram showing the carriage in its backward position and the right-hand diagram the carriage in its forward position.)

After the eye is slitted, as described, the blank No. 6 is moved under the eye-entering punch 26, carried by the bar $g^2$, and the said punch, co-operating with a suitable die, $g^3$, enters the eye and carries outward that inner portion of the slit side of the eye left by the slitting-cutter in the condition shown in No. 6, and at the same time the eye-closer $g^4$, pivoted upon a reciprocating carriage, $g^5$, which will be set in motion by a suitable lever acted upon by a cam on the main shaft 10, will be so moved as to operate upon the shorter side piece of the slitted side of the eye outside of it.

The blanks, operated upon as hereinbefore described, were, during the time they were being presented to the stamps, punches, cutters, &c., held between nippers mounted upon independent blocks, moved progressively forward.

Each nipper is composed of a fixed jaw, $h$, and a loose jaw, $h'$, held pressed toward the fixed part by a spring on a rod or pin within the movable jaw. (See Fig. 4.)

The nipper carrying or moving blocks $i$ have projections $i^3$ to enter grooves $w$ in the rising and falling needle-bed $l'$, having arms $l^x$ pivoted to the frame of the machine at $l^2$. (See Figs. 1, 3, and 15.) The said frame is raised and lowered at the proper times to place a needle-blank correctly in its die by means of a lever, $l^3$, acted upon by a cam, $l^4$, on the shaft 10. (See Fig. 15.)

All the several stamps, dies, and cutters operate simultaneously upon a number of blanks, each simultaneous operation upon each blank differing from the operation upon an adjacent blank.

At the ends of the rising and falling bed $l'$ are posts $l^5$, provided with squares $l^6$, having their four sides suitably grooved to receive dovetailed projections $i^3$ at the backs of the movable loose blocks $i$, to which the nippers are attached. This bed $l'$ is provided at its sides (see Fig. 15) with corresponding grooves $w$, to guide the blocks $i$ from end to end of the bed, and each block in its turn, as it is moved into the groove at the then outer face of the left-hand square of the bed, is, by the progressive quarter-rotation of the said square, carried from the front line of the bed about the post and into line with the back of the bed.

Before being changed from the front to the back of the bed, each nipper is supplied with a blank from a hopper, $m$, of usual construction, at the front of the bed, the nipper being temporarily opened below the hopper by a suitable nipper-opener, $k$.

The nippers, as the blanks are moved along the bed, retain the blanks and present them progressively and successively, and the blocks are moved horizontally to each tool or device employed to complete the eye.

Each post $l^5$ has fixed at its lower end a ratchet, $l^7$, having four teeth, (see Fig. 13,) which are engaged by a pawl, $l^8$, on a pawl-carrier, $l^9$, made as a sleeve, fitted to the post $l^5$, each pawl-carrier being provided with gear-teeth, as shown in the drawings, to be engaged by the teeth of a gear-wheel, $l^{10}$, loosely mounted upon a fixed stud, $l^{11}$, the said gear-wheel $l^{10}$ being reciprocated about its stud by means of a reciprocating toothed rack, $l^{12}$, actuated by a crank-pin, $w'$, at the end of a shaft, $l^{13}$, operated from shaft 10, the said crank-pin, as shown in the drawings, entering a slot in a head, $w^2$, attached to the rack. This rack $l^{12}$ has two series of teeth, as shown in Fig. 13, to actuate the wheels $l^{10}$ at each end of the bed $l'$, they moving the pawls and turning the squares intermittingly.

Each block $i$ will, in practice, have at its face a groove, $i^4$, to receive within it a holding-pawl, $i^5$, which is thereby permitted to serve as a stop to abut against the rear end of a block next in advance of that one in whose groove the pawl then rests, to prevent the said block from being moved backward, as hereinafter described.

The rack-bar $l^{12}$ has pivoted at its right-hand end a pawl, $n$, which, as the rack-bar is moved in the direction of the arrow, Fig. 1, acts upon the rear side of that block $i$ which then rests at the front side of the square $l^6$ at that end of the bed, and moves the block acted upon by it from the front side of the square into the groove $w$ at the outer face of the bed, and at the same time each block acts upon and moves the block next in advance of it, the last block of the series at the front of the bed at the left being moved into a groove in that face of the left-hand square which is then at the front.

As the left-hand square presents at the rear of the bed a block taken by it from the front of the bed, a pawl, $n'$, carried by a short rack-bar, $n^2$, moved by gear $l^{10}$, strikes and moves the said block from the then rear face of the square into the groove at the rear side of the bed, and this pawl $n'$, by its action successively upon the blocks $i$, moves each block and the whole series of blocks in advance of it at the rear of the bed progressively forward past the several tools which make the eye, as before described, the square at the right-hand end of the bed bringing the blocks, nippers, and their blanks having the eyes finished forward into line at the front of the bed at its right-hand end.

At each face of the squares, and within their grooves, are placed springs $o$, (see Fig. 4,) to retain the blocks in correct position with relation to the faces of the squares, the free end of each spring acting against a small projection at the rear side of each block, as shown in Fig. 4. Each square is provided at its lower side (see Fig. 5) with shoulders $o^2$, which, as the squares come into correct position, are acted upon by springs $o^3$ in grooves at the upper sides of the bed at its ends, (see Fig. 6,) to retain the squares in place.

In this machine it is obvious, instead of the exact mechanism shown in the drawings, that there may be employed other well-known mechanical equivalents for producing the movements.

When the several blanks being operated upon are to be changed from one die to another, the bed is lifted in order to lift the blanks from the dies preparatory to moving the blocks and nippers laterally.

The rod $w^8$ on the frame-work $w^9$ serves as a rest for the bed $l'$ when in its lowest position.

Each nipper holding a needle the eye of which has been acted upon as described, just as the block $i$ carrying it arrives one step in advance of the hopper, will be acted upon by a suitable nipper-opener like $k$, which will permit the nipper to be opened, so as to discharge or drop its needle into a box or receptacle, $x^2$. (Shown only in Fig. 3.)

The movable portion $h'$ of the nipper has a projection, $h^{10}$, which, at the proper time, will be acted upon by the nipper-opener $k$, pivoted on a rod connected with the upper side of the bed $l'$, and held under the control of a spring, as shown in Fig. 3. This nipper-opener will be, by a finger, $p$, acted upon to place it in position against the projection $h^{10}$, as described in the application filed by the said George Cooper.

I claim—

1. The combination, with a rising and falling bed, of a series of independent movable blocks connected therewith, and provided with nippers to hold the needle-blanks and move or carry them intermittingly forward, substantially as described.

2. A bed and intermittingly-operated squares mounted at its ends, combined with a series of independent nipper-carrying blocks connected with the said bed and squares, to permit the blocks to be moved along the sides of the bed and squares, the squares transferring the blocks from one to the other side of the bed, substantially as described.

3. A bed and intermittingly-operated squares at its ends, and independent nipper-carrying blocks fitted to the bed and squares, to be moved with relation to the bed and squares as described, combined with pawls to act upon and move the blocks from the sides of the squares into position to be held and guided by the sides of the bed, substantially as described.

4. The nipper-carrying blocks and the squares shaped to receive and carry them, combined with the posts to support the squares, and with a reciprocating pawl and ratchet to rotate the said posts and squares intermittingly, substantially as described.

5. In a machine for the manufacture of hand-sewing needles, a stamp and die to shape a blank to form the head of a needle, a punch and die to punch the eye, a rotating cutter to trim the surplus material from the head at one side of the eye, a cutter to trim the surplus material from the other side of the eye and the end of the head, and a slitting-cutter to cut a slit through one side of the eye, substantially as described.

6. The combination, with the bed and the nipper-carrying blocks $i$, notched at their front sides, of the block-holding pawls $i^5$, substantially as described.

7. A bed and intermittingly-operated squares at its ends, and independent nipper-carrying blocks fitted to the bed and squares, to be moved with relation to the bed and squares as described, combined with the rack-bars, pinions $l^{10}$, the toothed pawl-carriers, and pawls and ratchets to operate the squares, substantially as described.

In testimony whereof I have signed my name to this specification in the presence of two subscribing witnesses.

CHARLES WARREN CLIFFORD.

Witnesses:
 WENDELL H. COBB,
 THEO. F. TILLINGHAST.